United States Patent [19]

Allen

[11] Patent Number: 4,783,494

[45] Date of Patent: Nov. 8, 1988

[54] THERMOPLASTIC COMPOSITIONS OF POLYCARBONATE RESIN AND COPOLYMERS OF ETHYLENE AND ACRYLIC OR METHACRYLIC ACID

[75] Inventor: Richard B. Allen, Pittsfield, Mass.

[73] Assignee: General Electric Company, Pittsfield, Mass.

[21] Appl. No.: 54,379

[22] Filed: May 26, 1987

Related U.S. Application Data

[63] Continuation of Ser. No. 779,588, Sep. 24, 1985, abandoned.

[51] Int. Cl.$^4$ ............................................ C08L 69/00
[52] U.S. Cl. .................................. 524/139; 524/157; 524/508; 525/148; 525/67; 525/199
[58] Field of Search ................. 525/148; 524/139, 128

[56] References Cited

U.S. PATENT DOCUMENTS

| | | | |
|---|---|---|---|
| 3,586,656 | 6/1971 | DePaolo et al. | 524/128 |
| 3,855,277 | 12/1974 | Fox | 525/148 |
| 4,082,715 | 4/1978 | Mercier | 525/148 |
| 4,332,714 | 6/1982 | Haaf et al. | 525/93 |
| 4,513,119 | 4/1985 | Liu | 525/92 |
| 4,515,921 | 5/1985 | Witman | 525/148 |
| 4,532,282 | 7/1985 | Liu et al. | 525/148 |

Primary Examiner—Carman J. Seccuro
Attorney, Agent, or Firm—Hedman, Gibson, Costigan & Hoare

[57] ABSTRACT

Thermoplastic compositions useful for preparation into shaped articles are provided which are based on mixtures of an aromatic polycarbonate resin, such as a poly(bisphenol-A carbonate) resin, and a copolymer of ethylene and acrylic or methacrylic acid. The ethylene copolymer can be an ionically crosslinked addition polymer (ionomer) as provided when the acid groups are neutralized with metal cations, or they can simply be random copolymers which are not ionically crosslinked. Articles prepared from the compositions are more resistant to undergoing delamination than counterpart compositions based on mixtures of polycarbonate and polyethylene.

13 Claims, No Drawings

THERMOPLASTIC COMPOSITIONS OF POLYCARBONATE RESIN AND COPOLYMERS OF ETHYLENE AND ACRYLIC OR METHACRYLIC ACID

CROSS REFERENCE TO RELATED APPLICATION

This application is a continuation of U.S. Pat. application Ser. No. 779,588, filed Sept. 24 1985, now abandoned.

BACKGROUND OF THE INVENTION

1. Field of the Invention

This invention concerns thermoplastic molding and extrusion compositions of an aromatic polycarbonate resin and copolymers of ethylene and acrylic or methacrylic acid. The compositions exhibit good impact strength after molding while showing less tendency to delaminate in comparison with their prior art counterpart compositions of polycarbonate and polyethylene.

2. Description of the Prior Art

The aromatic polycarbonate resins constitute a well know family of polyesters of carbonic acid which are prepared from dihydric or polyhydric phenols through a condensation reaction with a carbonate precursor. The polycarbonate resins may be processed with a wide variety of conventional methods, including injection or compression molding, sheet or profile extrusion, thermoforming, blow molding and blown film extrusion. The finished products are characterized by an outstanding profile of properties, such as high ductility and stiffness, good dimensional stability, high creep resistance, good electrical properties, low water absorption and good stain resistance. These polymers are also noted for their glass-like clarity or transparency, which together with other properties makes them very useful in medical-related applications such as sterile packaging films, intravenous feeding kits and blood processing equipment.

Descriptions of the aromatic polycarbonate resins and methods of their preparation are set forth in the patent literature, including U.S. Pat. No. 3,153,008 (Fox), U.S. Pat. No. 2,946,766 (Schnell, et al.), and U.S. Pat. No. 3,028,365 (Schnell, et al.), incorporated herein by reference, and elsewhere.

As in the case of other thermoplastic polymers, attempts have been made to admix or blend aromatic polycarbonate resins with other polymers to upgrade one or more chemical or physical properties, for purposes of fitting specific end use requirements and to achieve a spectrum of properties not found with the individual polymers. Some of the attempts and results are described in the patent literature.

For instance, U.S. Pat. No. 3,431,224 (Goldblum) states that aromatic polycarbonate resins are made more resistant to environmental stress crazing and cracking by admixture with 0.25 to 50 percent of a modifier polymer selected from among polyethylene, polypropylene, polyisobutylene, copolymers of ethylene and alkyl acrylate, copolymers of ethylene and propylene, cellulose esters, polyamides, polyvinyl acetal, alkyl cellulose ethers and polyurethane elastomers. The patent notes in column 2, on lines 41-47, that the modifier polymers may themselves be subject to crazing or cracking while under stressful contact with organic solvents and would therefore not be expected to improve these properties when combined with the polycarbonate resin, yet they do.

U.S. Pat. No. 4,397,982 (Boutni and Liu) discloses thermoplastic compositions comprising a polycarbonate resin, a linear low density polyolefin (for example, polyethylene) and a multiphase interpolymer of a $C_{1-5}$ acrylate and a $C_{1-5}$ methacrylate (for example, Rohm and Haas' Acryloid KM-330, consisting of n-butyl acrylate and methyl methacrylate). These compositions are described as exhibiting superior impact properties at temperatures as low as $-30°$ C., and in addition good weld line strength, lower melt viscosity and improved heat stability compared with the corresponding unmodified polycarbonate compositions.

While the efficacy of polyolefin resins as modifiers for polycarbonates has unquestionably been recognized in the prior art, practice has often shown that products molded from compositions of a polycarbonate and a polyolefin tend to delaminate, especially when the composition contains higher amounts of the polyolefin. This is evidenced, when the molded article is cross-sectioned, by the appearance of fissures or cracks along seams in the interior of the article, where the molten polymers have flowed together during the molding cycle but failed to fully and compatibly mix into a bomogeneous whole. The effect is often more pronounced when relatively high shear conditions are used for molding. This lack of compatibility between the two polymers often results in poorer impact resistance, as well as deficiencies in other properties.

The need exists, therefore, for a material which can be substituted for polyethylene and other polyolefins in polycarbonate compositions without loss of the beneficial properties that characterize such compositions, while also reducing or completely avoiding the unfortunate tendency toward delamination.

SUMMARY OF THE INVENTION

The discovery has now been made that copolymers of ethylene and acrylic acid or methacrylic acid, either in the unneutralized, random copolymeric form (non-ionomeric) or the ionically cross-linked form (ionomeric), can be blended with aromatic polycarbonate resins to provide compositions which exhibit less tendency to delaminate than the corresponding compositions of the polycarbonate with polyethylene.

The compositions of this invention can be extruded or molded into products that possess good impact properties, and preliminary indications are that the compositions are more heat stable that the polyethylene-containing counterparts.

The ethylene-acrylic acid or ethylene-methacrylic acid copolymers and ionomers may be incorporated into the compositions in widely variant amounts, but for the most part satisfactory properties are obtained with use of from about 3 to about 25 parts by weight of this material for each 100 parts by weight of the polycarbonate resin.

Articles prepared from these compositions comprises another aspect of this invention.

DETAILED DESCRIPTION OF THE INVENTION

The aromatic polycarbonate resins, component (a), which are useful in the practice of this invention are high molecular weight, thermoplastic homopolymers or copolymers, and preferably those having recurring units of the formula

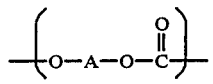

in which A is a divalent aromatic radical of the dihydric phenol employed in the polymer producing reaction. By dihydric phenols is meant mononuclear or polynuclear aromatic compounds containing two hydroxy radicals, each of which is attached to a carbon atom of an aromatic nucleus.

Especially preferred are aromatic polycarbonates comprised of repeating units of the formula

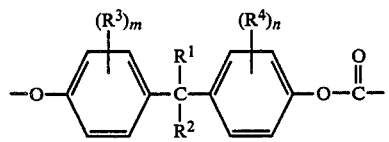

in which $R^1$ and $R^2$ are independently selected from among hydrogen, (lower) alkyl and phenyl; $R^3$ and $R^4$ are independently selected from among (lower) alkyl and (lower) alkenyl; m and n are zero or independently integers from 1 to the maximum number of replaceable hydrogen atoms on the ring; and the average number of repeating units is at least about 30, and more usually from about 40 to about 300.

The terms "(lower)alkyl" and "(lower)alkenyl" refer to alkyl and alkenyl groups having from 1 to about 10, more preferably from 1 to about 6 carbon atoms.

The preferred polycarbonates are typically characterized by an average molecular weight (number average) from about 8,000 to about 100,000 or greater, and an intrinsic viscosity from about 0.43 to about 1.0 deciliters per gram as measured in solution in chloroform at 25° C.

Typical of the dihydric phenols useful as starting materials in the formation of the above polycarbonates are: 2,2-bis(4-hydroxyphenyl) propane (bisphenol-A); hydroquinone; resorcinol; 2,2-bis(4-hydroxyphenyl) pentane; 2,4'-dihydroxydiphenol methane; bis(2-hydroxyphenyl) methane; bis(4-hydroxy-5-nitrophenyl) methane; 1,1-bis(4-hydroxyphenyl) ethane; 3,3-bis(4-hydroxyphenyl) pentane; 2,2'-dihydroxydiphenyl; 2,6-dihydroxy naphthalene; bis(4-hydroxyphenyl) sulfone; 2,2'-dihydroxydiphenyl sulfone; 4,4'-dihydroxydiphenyl ether; and 4,4'-dihydroxy-2,5-diethoxydiphenyl ether. Especially preferred is bisphenol-A.

In the preparation of the carbonate polymers used in the present invention only one dihydric phenol may be used. Alternatively, a mixture of two or more different dihydric phenols may be employed.

The carbonate precursor which is employed can be a carbonyl halide, a diaryl carbonate, or a haloformate. The carbonyl halides can be carbonyl chloride, carbonyl bromide, and mixtures thereof. The haloformates suitable for use include mono- or bihaloformates of dihydric phenols (bischloroformates of hydroquinone, monochloroformate of bisphenol-A, etc.) or bishaloformates of glycols (bishaloformate of ethylene glycol, neopentyl glycol, polyethylene glycol, etc.). When using bishaloformates, equimolar amounts of free dihydric phenols are required to effect polymerization. When polymerizing monohaloformates of diphenols no free diphenol is required. The diaryl carbonates include diphenyl carbonate, di(halophenyl) carbonates such as di(chlorophenyl) carbonate, di(bromophenyl) carbonate, di(trichlorophenyl) carbonate, etc., di(alkylphenyl) carbonates such as di(tolyl) carbonate, etc., di(naphthyl) carbonate, di(chloronaphthyl) carbonate, and the like. The preferred carbonate precursor is carbonyl chloride, also known as phosgene.

One method of preparing the aromatic carbonate polymers involves the heterogenous interfacial polymerization technique utilizing an aqueous caustic solution, an organic water immiscible solvent such as methylene chloride, at least one dihydric phenol, a carbonate precursor such as phosgene, a catalyst, a molecular weight regulator, and water.

Another useful method involves the use of an organic solvent system that also functions as an acid acceptor, at least one dihydric phenol, a molecular weight regulator, water and a carbonate precursor such as phosgene.

The catalysts which may be employed are any of the suitable catalysts that aid the polymerization reaction of the dihydric phenol with the carbonate precursor to produce the polycarbonates. Suitable polymerization catalysts include, but are not limited to, tertiary amines such as triethylamine, quaternary ammonium compounds, and quaternary phosphonium compounds.

The molecular weight regulators employed may be any of the well known compounds that regulate the molecular weight by a chain terminating mechanism. These compounds include, but are not limited to, phenol, tertiary butyl phenol, Chroman-I, para-cumylphenol, and the like.

The temperature at which the phosgenation reaction proceeds may vary from below 0° C. to above 100° C. The reaction proceeds satisfactorily at temperatures from room temperature (for example, about 25° C.) to about 50° C. Because the reaction is exothermic, the rate of phosgene addition may be used to control the reaction temperature.

The copolymer of ethylene and acrylic acid or methacrylic acid, which may be represented as component (b) of these compositions, can be an ionically cross-linked addition copolymer of the two ingredients as prepared by conventional processes, including those described in U.S. Pat. No. 3,322,734 (Rees), which is incorporated herein by reference. In general, these are thermoplastic addition polymers containing a quantity of acid groups, for example, from 0.2 to 25 mole percent (although the acid content can vary outside this range). The acid groups may be attached to the polymer in various ways, such as by copolymerizing a portion of the acrylic or methacrylic acid with ethylene, the predominant monomer, or by graft polymerizing acrylic or methacrylic acid onto polyethylene, or even by grafting acid groups onto polyethylene. Thus, the term "copolymer" is used here in a broad sense, but one which is understandable to those skilled in the art. These copolymers may also include minor amounts of one or more other comonomers, as explained, for instance, in the Rees patent.

Preparation of the copolymers may be accomplished using a number of different procedures, such as by exposing a solution or finely divided powder of the major comonomer, for example, polyethylene, to ionizing radiation in the presence of the acid comonomer. In another method, the polymer of the major comonomer in solution or finely divided form is contacted with a solution of the acid and a peroxide. The copolymers may also be obtained by copolymerizing ethylene with a derivative of the acid, such as an ester, which is reacted to form the corresponding acid. All of these are standard techniques available in the scientific literature to those skilled in the art.

The copolymers are thereafter reacted with metal compounds in a procedure which is sometimes referred to as "neutralization", resulting in the ionic cross-linking of the copolymers. Such metal compounds include ionizable metal compounds which provide metal ions having a valence state of one or more, as detailed in the Rees patent. The alkali metals appear to be preferred, with special mention being made herein of sodium, zinc and potassium. The metal ions, which attach to the acid groups in the copolymer, apparently serve as "bridges" which link adjacent copolymers, although the actual mechanism may not be entirely understood.

A commercial product suitable for use as component (b) in the present compositions is manufactured by the DuPont Company, Wilmington, Delaware, under the trade designation SURLYN ® Ionomer Resin.

Alternatively, an unneutralized thermoplastic copolymer of ethylene and acrylic or methacrylic acid, particular in which the units are randomly distributed along the polymer chain, can be used. A suitable material of this type is also available from the DuPont Company, under the trade designation NUCREL Resin.

Regardless of which of these two types are employed, the neutralized (ionomeric) or the unneutralized (non-ionomeric), satisfactory results are obtained and the properties are comparable.

The compositions can also include one or more supplementary ingredients, which may be selected from among materials known to be useful with polycarbonate resins and blends. They may be relatively inert materials or they may be additives which affect the chemical or physical properties of the composition during or after molding. Such supplementary materials include mineral fillers, for example, clay, talc, or mica; reinforcing agents or fillers, for example, glass fibers, flakes or spheres; plasticizers; stabilizers; antioxidants; colorants, such as dyes or pigments; mold release agents; flame retardant agents; smoke suppressants; drip retardants; and so forth. Amounts may be conventional, for example, ranging from about 1 to about 50 percent by weight, or more, based on the total weight of the composition.

The compositions may be formulated to contain, especially, one or more flame retardant agents. They may be selected from among materials containing chemical elements known for their ability to impart flame resistance, for example, bromine, chlorine, antimony, phosphorus and nitrogen. Included among them are various aliphatic and aromatic phosphates and phosphonates; halogenated (for example, brominated or chlorinated) organic compounds alone or in admixture with antimony oxide; halogen-containing compounds in admixture with phosphorus compounds containing phosphorus-nitrogen bonds; and halogenated polymers such as brominated or chlorinated polystyrene or halogenated oligomers such as brominated or chlorinated aromatic polycarbonate oligomers.

Processing of the compositions into finished, shaped articles is carried out in any convenient manner. A mixture of the ingredients may be extruded, or molded, or otherwise worked at elevated temperatures above the softening temperatures of the resins, using conventional procedures and conditions. In one procedure, a premixture of the ingredients is formed, the premixture is extruded at a temperature between 450° (232°) and 600° (316°)°F. (°C.) the extrudate is cooled, cut into molding pellets, and the pellets are injection molded into a shaped article using a screw injection molding machine and an injection melt temperature between 450° (232°) and 600° (316°)°F.(°C.) and a mold temperature of 150° (66°) to 250° (121°)°F.(°C.).

The described compositions are useful for purposes typical of thermoplastic polycarbonate molding compositions and can be utilized to prepare articles typified by such compositions previously.

DESCRIPTION OF THE SPECIFIC EMBODIMENTS

The invention is further illustrated in the following examples, which are presented for instructional purposes only and are not meant to be limiting.

EXAMPLES 1-4

The compositions shown in Table 1 below were prepared by mixing the ingredients in a shaker-container for 5 minutes, extruding the mixture though a ¾-inch Killion single screw extruder at a temperature of 525° (274°)°F.(°C.), drying the extrudate for 3 hours at 250° (121°)°F.(°C.), and molding into test pieces using a ¾-ounce Newbury injection molding machine set at a temperature of 525° (274°)°F.(°C.).

TABLE 1

| Ingredients of Parts by Weight | Example 1 | 2 | 3 | 4 | Control |
|---|---|---|---|---|---|
| Poly(bisphenol-A carbonate) resin (Lexan ® 140, General Electric Co.) | 100 | 100 | 100 | 100 | 100 |
| Ethylene-methacrylic acid copolymer (Nucrel 035, DuPont Co.) | 5 | — | 10 | — | — |
| Ethylene-methacrylic acid copolymer (Nucrel 925, DuPont Co.) | — | 5 | — | 10 | — |
| Phosphite stabilizer | 0.07 | 0.07 | 0.07 | 0.07 | 0.07 |
| Physical Properties[1] | | | | | |
| Heat distortion temperature, °C. | 126 | 126 | 127 | 128 | 128 |
| Notched Izod impact strength, ft.lb./in. | 13.5 | 9.0 | 14.6 | 6.5 | 12 |
| Flexural modulus, psi $\times 10^3$ | 314 | 315 | 288 | 290 | 348 |
| Flexural strength, psi $\times 10^3$ | 11.8 | 11.7 | 10.5 | 10.4 | 14.4 |

TABLE 1-continued

| Ingredients of Parts by Weight | Example 1 | 2 | 3 | 4 | Control |
|---|---|---|---|---|---|
| Tensile strength at yield, psi × 10³ | 8.4 | 8.3 | 7.7 | 7.7 | 8.8 |
| Elongation % | 104 | 79 | 92 | 92 | — |
| Surface gloss, at 60° angle | 66 | 28 | 85 | 25 | 100 |
| Delamination, 1/32 inch-thick test bar | None | None | None | None | None |
| Skin after tensile break | None | None | None | Slight | None |
| Solvent Resistance[2] | | | | | |
| Trichloroethane | Cr(13) | Cr(22) | Cr(13) | (No Cr @ 30) | Cr(21) |
| Dioctyl phthalate | Cr(8) | Cr(11) | Cr(20) | Cr(20) | Cr(8) |
| Hexane | Cz(2) | Cz(2) | None | None | Cz(0) |
| 30% Solution of ethanol amine in methyl alcohol | Cr(17) | Cr(2) | None | Cr(3) | Cr(1) |

[1]Tested as per ASTM procedures.
[2]Tested using ½ inch × ⅛ inch × 2½ inch test bars put in strain jig at 1% strain. The test bars were soaked in the solvents shown for up to 30 minutes. The abbreviation "Cr" designates occurrence of crackingand "Cz" indicates crazing after the time interval in minutes given in parentheses.

Examples 5-6

These examples illustrate compositions in accordance with this invention formulated to be flame retardant.

The compsoitions shown in Table 2, below, were prepared using the same procedure described in the previous examples. The molded test samples were evaluated for notched Izod impact strength and gloss using the same test procedures referred to previously, and for flame retardancy using the Underwriters Laboratories, Test Bulletin No. 94 Method.

TABLE 2

| Ingredients, Parts by Weight | Example 5 | 6 |
|---|---|---|
| Poly(bisphenol-A carbonate) resin (Lexan ® 140) | 100 | 100 |
| Ethylene-methacrylic acid copolymer (Nucrel 035, DuPont Co.) | 3 | — |
| Ethylene-methacrylic acid copolymer(Nucrel 925, DuPont Co.) | — | 2 |
| 50:50 Tetrabromo bisphenol-A: bisphenol-A copolycarbonate flame retardant agent | 3 | 3 |
| Organic phosphite stabilizer | 0.1 | 0.1 |
| Organic sulfonate salt flame retardant agent | 0.8 | 0.8 |
| Polytetrafluorethylene drip suppressant(Teflon resin, DuPont Co.) | 0.12 | 0.12 |
| Properties | | |
| Notched Izod impact strength, ft.lb./in. | 9.5 | 9.3 |
| Surface gloss, 60° | 68 | 75 |
| UL-94 Rating, 1/16-inch thick test sample | V-1 | V-1 |

Example 7-8

These examples are presented to illustrate a comparison between two polycarbonate compositions in unneutralized, random ethylene-methacrylic acid copolYmer (DuPont's Nucrel Resin) and a neutralized hylene-methacrylic acid copolymer (DuPont's Surlyn ® Ionomer Resin), and a third, polycarbonate composition which contains polyethylene in accordance with the prior art. The three compositions were prepared identically by pre-drying the polycarbonate resin for 2 hours at 112° C., extruding the ingredients on a Brabender single screw extruder using a 1/1 screw, to produce milky white strands, drying the extrudate for 3 hours at 110° C., and then molding into test bars using a 4 ounce Newbury injection molding machine under the following conditions:

Barrel set temp.=510° F.(266° C.)
Melt temp.=540° F.(282° C.)
Injection time=12 seconds
Fill time=1.0 seconds
Total cycle time=35 seconds
Mold temp.=180° F. (82° C.)
Screw speed=80 r.p.m.
Injection line pressure=850 psi Back pressure=80 psi The three compositions are given in Table 3, below. The amounts are in parts by weight.

TABLE 3

| | Polycarbonate Resin Compositions | | | |
|---|---|---|---|---|
| Example | Poly(bisphenol-A carbonate)resin, Lexan ® 141, GE | Nucrel 035 | Surlyn ® 9720 | LLDPE |
| 7 | 100 | 10 | — | — |
| 8 | 100 | — | 10 | — |
| A* | 100 | — | — | 10 |

*comparison
LLDPE = Union Carbide's linear low density polyethylene, G 8320

From an observation of the way in which the molds for the flame test bars filled, it appeared that the composition of Example 8 (containing Surlyn ® resin) had the highest initial viscosity, comparison composition A (containing polyethylene) had the next highest, and the composition of Example 7 (containing Nucrel resin) had the lowest viscosity.

The delamination measurement produced the following results:
Example 8— Best
Example 7— Better
Comparison *A— Worst The other properties measured are listed in Tables 4A and 4B. Details regarding the testing are set forth in Table 4C.

TABLE 4

Properties of
Polycarbonate Resin Compositions

Instrumented
Impact Resistance

TABLE 4-continued

| Example | Heat Deflection Temp., °F. | Izod Impact Str., ft.lbs./in. | Peak Load, lbs. | Energy @ Peak Load, ft.lbs. | Total Energy, ft.lbs. |
|---|---|---|---|---|---|
| 7 | 257 | 16.9 | 641 | 12.17 | 16.5 |
| 8 | 259 | 15.6 | 1144 | 36.15 | 37.6 |
| A | 258 | 13.5 | 843 | 21.05 | 22.5 |

Properties of Polycarbonate Resin Compositions

| Example | Tensile Properties | | | Flexural Properties | |
|---|---|---|---|---|---|
| | Yield Str., psi | Str. Break, psi | Elong. Break, % | Yield Str., psi | Modulus, psi |
| 7 | 7731 | 5788 | 90 | 10,870 | 290,049 |
| 8 | 7936 | 8861* | 169 | 11,087 | 297,202 |
| A | 7912 | 5784 | 80 | 11,010 | 296,433 |

TEST PROCEDURES AND SPECIMEN GEOMETRY

| Test | Procedure | Specimen Size | Special Comments |
|---|---|---|---|
| Izod Impact | ASTM D256 | Notched ⅛ in. × ½ in. × 2½ in. bar. | 10 ft. lb. hammer |
| Instrumental Impact | ASTM D3763 | ⅛ in. × 4 in. diameter disk | ½ in. dart, 3 inch opening, 7.5 mph |
| Heat Deflect. Temp. | ASTM D648 | ¼ in. × ½ in. × 5 inch bar | @ 264 psi |
| Tensile | ASTM D638 | 8½ in. tensile bar | |
| Flexural | ASTM D790 | ¼ in. × ½ in. × 5 inch bar | |

*Elongation extended beyond the "neck" portion of the test bar to the tab ends. This results in a higher than true value for strength at break.

In addition, an attempt was made to assess the degree of polymer degradiation, if any, for each of the compositions by measuring the decline in the melt viscosity of each composition after 3 and 15 minute intervals. The compositions were subjected to a temperature of 550° F.(288° C.), under a shear rate of 300 sec.$^{-1}$. The results were inconclusive, but initial determinations appeared to show that the polyethylene-containing composition (composition A, above) underwent a substantially greater loss in the melt viscosity than both the Example 7 and Example 8 compositions, by which it can be inferred that the comparison composition was more susceptible to polymer degradation and thus less heat stable than the other two.

As will be clear from a reading of the foregoing description, other variations of the invention are possible, and the compositions can be modified from the particular embodiments illustrated without departing from the scope of the invention defined in the appended claims and while still retaining the chief benefits.

I claim:

1. A thermoplastic composition, consisting of
   (a) a poly(bisphenol-A carbonate) homopolymer resin; and
   (b) a copolymer, ionomeric or non-ionomeric, of ethylene and a comonomer selected from the group consisting of acrylic acid and methacrylic acid, alone or in combination with a stabilizer, a flame retadant agent or a drip suppressant.

2. A composition according to claim 1, in which the aromatic polycarbonate resin is a high molecular weight thermoplastic homopolymer or copolymer having recurring units of the formula

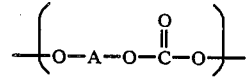

in which A is a divalent aromatic radical of a dihydric phenol.

3. A composition according to claim 2, in which the aromatic polycarbonate resin comprises repeating units of the formula

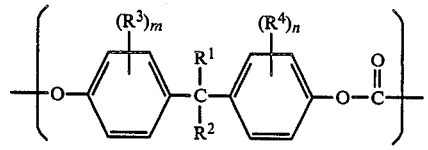

in which $R^1$ and $R^2$ are independently selected from among hydrogen, (lower) alkyl and phenyl; $R^3$ and $R^4$ are independently selected from among (lower) alkyl and (lower) alkenyl; m and n are zero or independently integers from 1 to the maximum number of replaceable hydrogen atoms on the ring; and the average number of repeating units is at least about 30.

4. A composition according to claim 1, in which the poly(bisphenol-A carbonate) resin has an intrinsic viscosity from about 0.43 to about 1.0 deciliters per gram as measured in solution in chloroform at 25° C.

5. A composition according to claim 1, in which component (b) is an ionically crosslinked thermoplastic addition copolymer (ionomer) of ethylene and a comonomer selected from acrylic acid and methacrylic acid.

6. A composition according to claim 1, in which component (b) is a random copolymer of ethylene and a comonomer selected from acrylic acid and methacrylic acid.

7. A composition according to claim 1, in which component (b) is present in an amount from about 3 to about 25 parts by weight, for each 100 parts of by weight component (a).

8. A composition according to claim 1, in which the stabilizer is an organic phosphite.

9. A compositions according to claim 1 in which the flame retardant agent is selected from brominated polycarbonates, organic sulfonates, and mixtures of the two.

10. A composition according to claim 1, in which the drip suppressant is a polytetrafluoroethylene resin.

11. An article shaped from the composition of claim 1.

12. An extruded article according to claim 11.

13. A molded article according to claim 11.